US006865549B1

(12) United States Patent
Connor

(10) Patent No.: US 6,865,549 B1
(45) Date of Patent: Mar. 8, 2005

(54) METHOD AND APPARATUS FOR CONCURRENCY CONTROL IN A POLICY-BASED MANAGEMENT SYSTEM

(75) Inventor: William H. Connor, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/489,464

(22) Filed: Jan. 21, 2000

Related U.S. Application Data

(60) Provisional application No. 60/165,552, filed on Nov. 15, 1999.

(51) Int. Cl.[7] .............................................. G06F 17/60
(52) U.S. Cl. ................................ 705/51; 707/8; 707/9; 340/3
(58) Field of Search ......................... 705/51, 54–75; 707/8–10, 100–104, 200–201; 709/213–214; 710/6–7, 200; 711/147–148; 340/3, 5

(56) References Cited

U.S. PATENT DOCUMENTS

| | | | | |
|---|---|---|---|---|
| 4,721,954 A | * | 1/1988 | Mauch | 340/5.54 |
| 4,760,393 A | * | 7/1988 | Mauch | 340/5.54 |
| 5,551,046 A | * | 8/1996 | Mohan et al. | 395/800 |
| 5,615,373 A | * | 3/1997 | Ho | 395/726 |
| 5,774,058 A | * | 6/1998 | Henry et al. | 340/5.5 |
| 5,797,128 A | | 8/1998 | Birnbaum | 707/5 |
| 5,872,928 A | | 2/1999 | Lewis et al. | 395/200.52 |
| 5,889,953 A | | 3/1999 | Thebaut et al. | 395/200.51 |
| 5,890,153 A | * | 3/1999 | Fukuda et al. | 707/8 |
| 5,907,844 A | * | 5/1999 | Guay et al. | 707/100 |
| 6,061,692 A | * | 5/2000 | Thomas et al. | 707/200 |
| 6,064,316 A | * | 5/2000 | Glick et al. | 340/5.65 |
| 6,161,150 A | * | 12/2000 | Sudhakaran et al. | 710/8 |
| 6,300,873 B1 | * | 10/2001 | Kucharczyk et al. | 340/568.1 |
| 6,477,539 B1 | * | 11/2002 | Smith | 707/103 R |

FOREIGN PATENT DOCUMENTS

| | | | |
|---|---|---|---|
| EP | 0 665 495 A2 | 2/1995 | |
| EP | 0 903 677 A2 * | 3/1999 | G06F/17/30 |

OTHER PUBLICATIONS

Konana et al., "Semantics–Based Transaction Processing for Real–Time Dabases: The case of Automated Stock Trading", Informs Journal on Computing v11n3 pp: 299–315, summer 1999, ISSN: 1091–9856.*
Publication entitled "Two–Tier Paging and its Performance Analysis for Network–based Distributed Shared Memory Systems", by Chi–Jiunn Jou et al., XP 000545634, E78–D, Aug. 1995, No. 8, Tokyo, Japan.

* cited by examiner

Primary Examiner—James P. Trammell
Assistant Examiner—Mary Cheung
(74) Attorney, Agent, or Firm—Park Vaughan & Fleming, LLP

(57) ABSTRACT

A system that facilitates concurrency control for a policy-based management system that controls resources in a distributed computing system. The system operates by receiving a request to perform an operation on a lockable resource from a controller in the distributed computing system. This controller sends the request in order to enforce a first policy for controlling resources in the distributed computing system. In response the request, the system determines whether the controller holds a lock on the lockable resource. If so, the system allows the controller to execute the operation on the lockable resource. If not, the system allows the controller an opportunity to acquire the lock. If the controller is able to acquire the lock, the system allows the controller to execute the operation on the lockable resource.

26 Claims, 4 Drawing Sheets

METHOD AND APPARATUS FOR CONCURRENCY CONTROL IN A POLICY-BASED MANAGEMENT SYSTEM

RELATED APPLICATION

This application hereby claims priority under 35 U.S.C. § 119 to Provisional Patent Application No. 60/165,552 filed on Nov. 15, 1999.

BACKGROUND

1. Field of the Invention

The present invention relates to managing resources in a distributed computing system. More specifically, the present invention relates to a method and an apparatus for providing concurrency control between policies in a policy-based management system, wherein the concurrency control is accomplished through locking of resources and/or controllers for resources in a distributed computing system.

2. Related Art

Automated management systems are increasingly being used to control the actions of resources within distributed computing systems. Some of these automated management systems are policy-based, which means they automatically enforce a policy that is specified by one or more rules. For example, a policy can specify that a distributed storage system should maintain a reserve of 30% in extra storage capacity. In enforcing the policy, the system continually monitors its reserve of extra storage capacity. If additional storage capacity gets depleted, or if one or more storage devices fail, the system automatically takes action to bring additional storage devices on line.

In some situations, two or more management policies may attempt to manage the same resource at the same time. The resulting concurrent management can result in inconsistent or ineffective management of the resource. For example, a policy that attempts to ensure that all requests to a service are processed within a fixed amount of time can conflict with a policy that attempts to ensure that priority requests are processed first. In this case, if there are too many priority requests, some non-priority requests may not be processed within the fixed amount of time.

Conflicting policies can cause instability in the system because as the policies conflict with each other, none of the policies accomplishes its objectives. This can cause each of the policies to increase their inputs into the system in an effort to accomplish their conflicting objectives. These increased inputs (that are likely to conflict) can result in unstable behavior.

Conflicting policies can also cause resources to be inconsistent. For example, a first policy may cause routers in a system to be configured to maximize bandwidth of the system, while a conflicting second policy may cause routers to be configured to maximize reliability of the system. In this case, the first policy may cause some of the routers to be configured to maximize bandwidth, while the second policy causes other routers to be inconsistently configured to maximize reliability. This inconsistency may cause both policies to fail.

Some systems attempt to detect conflicts between policies "up front," before the policies are actually deployed. Unfortunately, this up front analysis cannot simulate all of the possible ways in which conflicts can arise between policies. Hence, the resulting analysis may be overly conservative, because the analysis may detect potential conflicts that do not actually occur during normal system operation. On the other hand, the resulting analysis may ignore conflicts that appear to be improbable, but that actually occur during system operation.

What is needed is a method and an apparatus that facilitates coordination co of potentially conflicting policies for managing resources in a distributed computing system.

SUMMARY

One embodiment of the present invention provides a system that facilitates concurrency control for a policy-based management system that controls resources in a distributed computing system. The system operates by receiving a request to perform an operation on a lockable resource from a controller in the distributed computing system. This controller sends the request in order to enforce a first policy for controlling resources in the distributed computing system. In response the request, the system determines whether the controller holds a lock on the lockable resource. If so, the system allows the controller to execute the operation on the lockable resource. If not, the system allows the controller to acquire the lock. If the controller is able to acquire the lock, the system allows the controller to execute the operation on the lockable resource.

In one embodiment of the present invention, locks held by a controller expire after a pre-specified lease period, unless the lease is renewed within the pre-specified lease period.

In one embodiment of the present invention, the first policy is configured to command resources in the distributed computing system to perform actions so that the distributed computing system operates in accordance with a rule that is enforced by the first policy. Note that this rule governs behavior of resources within the distributed computing system.

In one embodiment of the present invention, the system throws an exception if the controller does not hold a lock on the lockable resource and if the controller does not acquire a lock.

In one embodiment of the present invention, the lockable resource includes a resource within the distributed computing system.

In one embodiment of the present invention, the lockable resource is itself a second policy for controlling resources in the distributed computing system.

In one embodiment of the present invention, the controller includes a client in the distributed computing system.

In one embodiment of the present invention, the controller includes the first policy for controlling resources in the distributed computing system.

In one embodiment of the present invention, the controller includes a higher-level policy for controlling resources in the distributed computing system, and the lockable resource includes a lower-level policy for controlling resources in the distributed computing system.

In one embodiment of the present invention, the controller acquires a lock from a lockable resource that allocates locks to controllers.

In one embodiment of the present invention, the lockable resource presents one or more independent locks providing access to independent sub-units of the resource.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
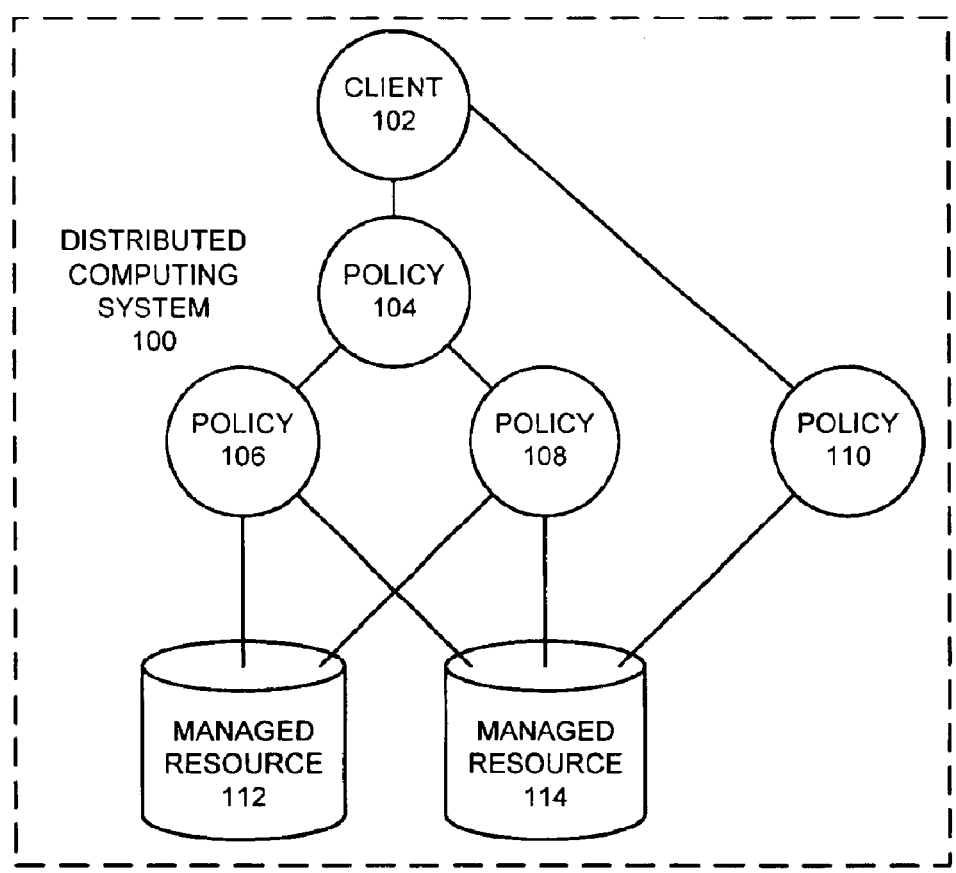
FIG. 1 illustrates a distributed computing system in accordance with an embodiment of the present invention.

FIG. 1 illustrates a distributed computing system in accordance with an embodiment of the present invention. Distributed computing system 100 includes client 102, which communicates with policies 104 and 110. Note that policy 104 is a higher-level policy that communicates with lower-level policies 106 and 108. Polices 106, 108 and 110 in turn communicate with managed resources 112 and 114. Client 102 can include any type of entity that locates and communicates with management services. For example, client 102 can include a human user, a user interface for an administrative user, a client computing system that requests computational and/or data storage resources from a server computer system, or a control program.

In one embodiment of the present invention, policies 104, 106, 108 and 110 assume the form of software components that allow a resource or a policy to be managed at an increased level of abstraction. A policy typically enforces a set of one or more rules that are associated with the policy. Note that rules may be expressed using a number of different means, including through graphical interfaces, through languages such as the JAVA™ programming language, and through natural languages (such as English). (Java is a registered trademark of SUN Microsystems, Inc. of Palo Alto, Calif.)

A policy may control managed resources of the distributed computing system 100, such as managed resources 112 and 114. A policy may also control other policies. For example, in FIG. 1 policy 104 is a higher-level policy that controls lower-level policies 106 and 108. In this case, higher-level policy 104 may enforce a rule that specifies a distributed storage system should maintain a reserve of 30% in extra storage capacity. This higher-level policy 104 may control a lower-level policy 106 that enforces a rule that if a storage device fails a purchase order is generated for a replacement storage device.

Once a policy is implemented as a software component, the software component is typically configured to automatically monitor the system, and to take actions to enforce the policy without a human being or higher-level program being involved in the enforcement process.

Managed resources 112 and 114 may include entities such as devices, appliances, systems and applications that are managed by "controllers" within distributed computing system 100. Note that a number of standards are emerging for communicating with managed resources, such as the Web Based Enterprise Management (WBEM) standard.

The term "controller" as used in the application can refer to any entity that can control a "lockable resource." For example, a controller can include a client, such as client 102 or a policy, such as policies 104, 106, 108 and 110.

The term "lockable resource" as used in this application can refer to any resource that can be locked by a controller. For example, a lockable resource can include a managed resource, such as managed resources 112 and 114, as well as a policy, such as policies 104, 106, 108 and 110. Lockable resources may present one or more exclusive locks. For example, a storage device may include a lock for controlling the cooling of a power supply for the storage device, as well as a lock for processing requests to the storage device.

Figure 2:
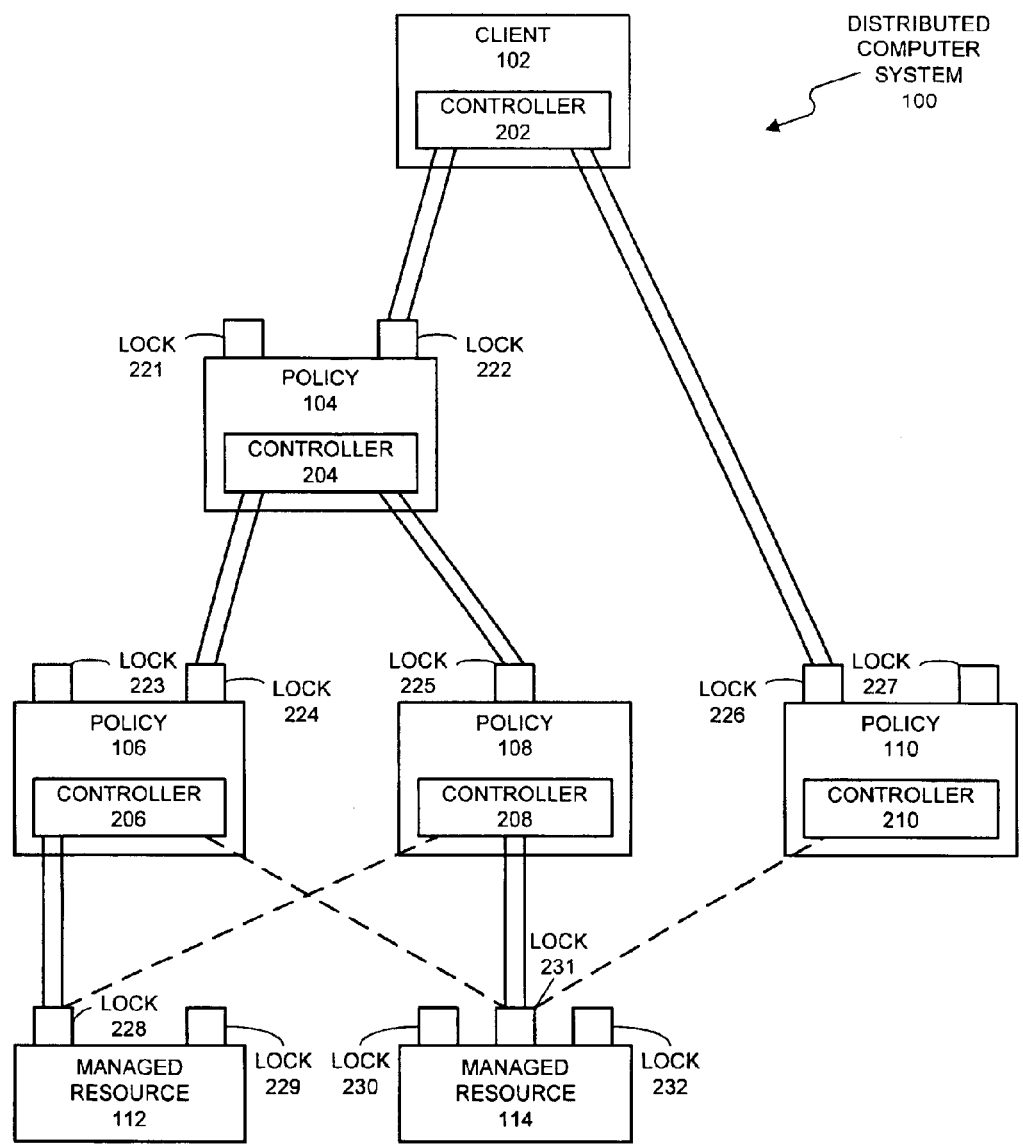
FIG. 2 illustrates the distributed computing system of FIG. 1 in more detail in accordance with an embodiment of the present invention.

FIG. 2 illustrates distributed computing system 100 from FIG. 1 in more detail in accordance with an embodiment of the present invention. In this embodiment, client 102 and policies 104, 106, 108, and 110 contain controllers 202, 204, 206, 208 and 210, respectively. Controllers 202, 204, 206, 208 and 210 can control lockable resources.

Lockable resources, such as policies and managed resources, present one or more exclusive locks that may be held by a controller. More specifically, policy 104 presents locks 221 and 222. Policy 106 presents locks 223 and 224. Policy 108 presents lock 225. Policy 110 presents locks 226 and 227. Managed resource 112 presents locks 228 and 229. Finally, managed resource 114 presents locks 230, 231 and 232.

In this embodiment of the present invention, each lock may only be held by a single controller at the same time. This prevents conflicting controllers from controlling critical sections of the same lockable resource at the same time. In FIG. 2, client 102 holds locks on policy 104 and policy 110; policy 104 holds locks on policies 106 and 108; policy 106 holds a lock on managed resource 112; and policy 108 holds a lock on managed resource 114.

Note that lock 228 held by policy 106 precludes policy 108 from holding lock 228. Also note that lock 231 held by policy 108 precludes policies 106 and 110 from holding lock 231.

Controller

Figure 3:
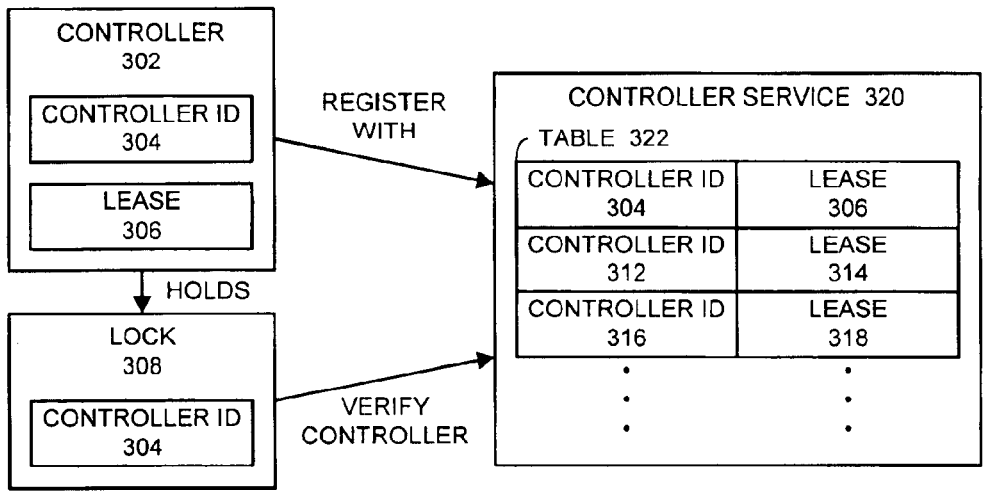
FIG. 3 illustrates the interplay between a controller, a lock and a controller service in accordance with an embodiment of the present invention.

FIG. 3 illustrates the interplay between controller 302, lock 308 and controller service 320 in accordance with an embodiment of the present invention. As mentioned above, controller 302 can include any entity that can control a lockable resource. To facilitate the locking process, controller 302 registers with controller service 320 to receive controller ID 304 and lease object 306.

In one embodiment of the present invention, controllers do not release locks that they have acquired. Controllers that wish to change their set of locks do so by canceling themselves with controller service 320, and then re-registering (as effectively a new controller).

Controller ID 304 is used to uniquely identify controller 302. While invoking operations on lockable resources, controller 302 passes controller ID 304 to the lockable resources. In one embodiment of the present invention, controller ID 304 is passed implicitly rather than explicitly as an argument.

Lease object 306 facilitates detecting the unexpected loss of controller 0.302, thereby allowing stale locks to be released. In one embodiment of the present invention, controller ID 304 is "leased" to controller 302 for a time period of limited duration. Controller 302 periodically renews the lease with controller service 320 to maintain control over the locks. Failure to renew the lease is interpreted by controller service 320 as an unexpected loss of controller 302. Alternatively, controller 302 can cancel the lease to indicate that the controller 302 no longer holds the lock 308, or any other locks previously held by controller 302. In either case (failure to renew or cancellation), lock 308 is no longer considered to be owned by the controller 302.

The system uses controller service 320 to manage controllers. This allows the system to tolerate certain partial failures, such as the loss of a controller. Controller service 320 maintains a table 322 of controller ID/lease object pairs that have been issued to registered controllers. More specifically, table 322 contains entries for, controller ID 304 and associated lease object 306, controller ID 312 and associated lease object 314, as well as controller ID 316 and associated lease object 318. Note that a controller that cancels or fails to renew a lease will have its corresponding record in controller service 320 removed.

Process of Registering a Controller

Figure 4:
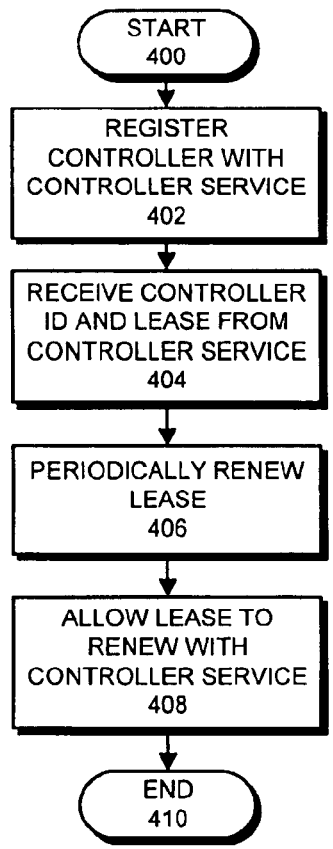
FIG. 4 is a flow chart illustrating how a controller is registered and renewed in accordance with an embodiment of the present invention.

FIG. 4 is a flow chart illustrating how a controller is registered and renewed in accordance with an embodiment of the present invention. The system starts at step 400. Controller 302 registers with controller service 320 (step 402). Controller service 320 makes an entry in table 322 for controller ID 304 and lease object 306, and then returns controller ID 304 and lease object 306 to controller 302 (step 404). Controller 302 periodically renews lease object 306 (step 406). In one embodiment of the present invention, this is accomplished by activating lease object 306, which causes lease object 306 to contact controller service 320 in order to renew the lease (step 408). The system then ends at step 410.

Process of Accessing a Lockable Resource

Figure 5:
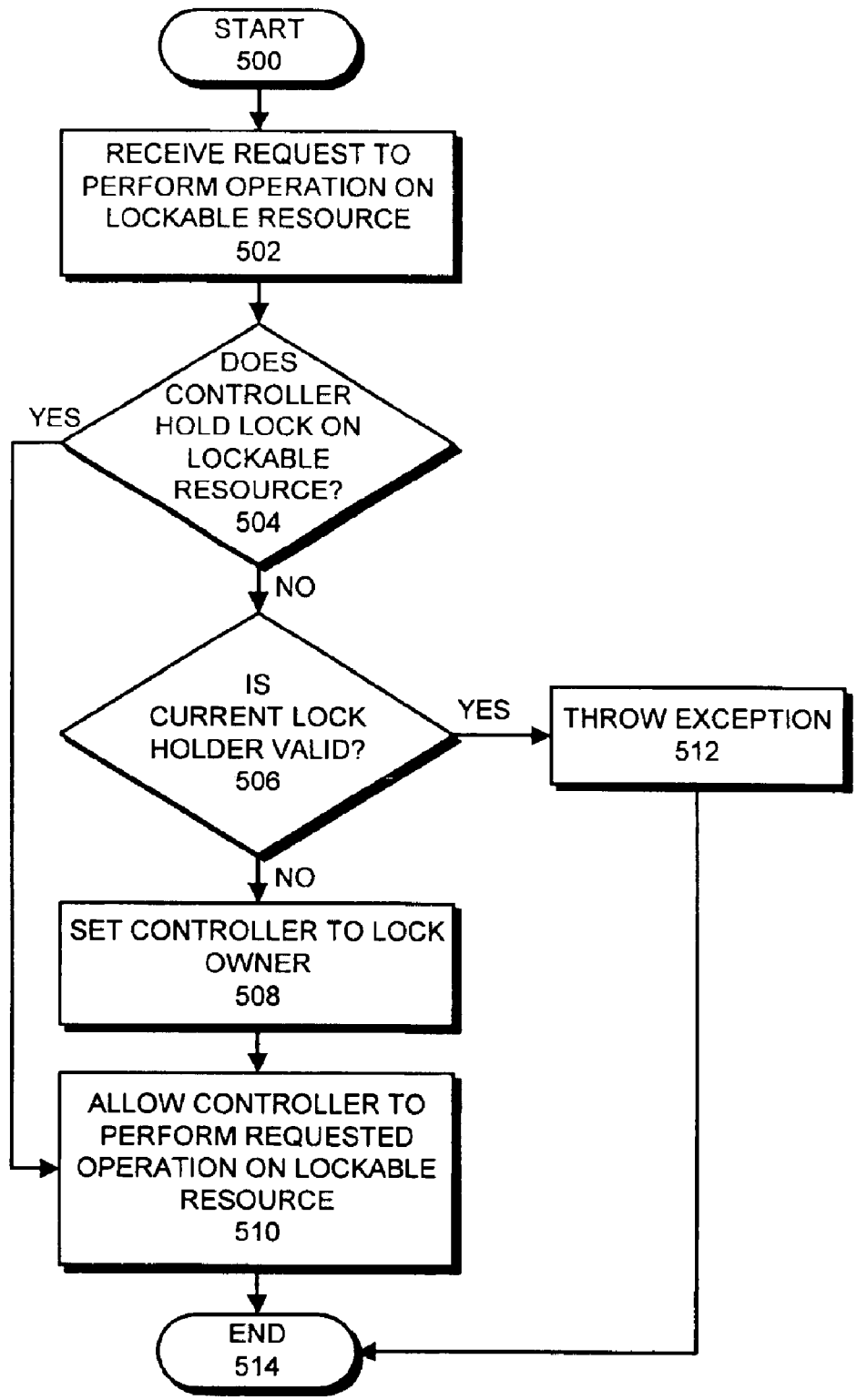
FIG. 5 is a flow chart illustrating how a request to access a lockable resource is processed in accordance with an embodiment of the present invention.

FIG. 5 is a flow chart illustrating how a request to access a lockable resource is processed in accordance with an embodiment of the present invention. The system starts at step 500. The system first receives a request from controller 302 to perform an operation on a lockable resource (step 502). In one embodiment of the present invention, controller ID 304 is implicitly passed along with the request. In response to the request, the system determines if controller 302 holds a lock on the lockable resource (step 504). This entails comparing the implicitly passed controller ID 304 with the controller ID 304 that is stored within lock 308. If controller 302 has a lock on the lockable resource, the system allows controller 302 to perform the requested operation on the lockable resource (step 510).

If controller 302 does not have a lock on the lockable resource, the system queries controller service 320 to determine if the current lock holder is still valid (step 506). If the current lock holder is still valid, controller 302 is not able to proceed with its access to the lockable resource. Consequently, the system throws an exception (step 512). This completes the process (step 514).

If the current lock holder is not valid, the system causes controller 302 to be noted as the lock owner (step 508).

Next, the system allows controller 302 to perform the requested operation on the lockable resource (step 510). This completes the process (step 514).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for providing concurrency control for a policy-based management system that controls resources in a distributed computing system, the method comprising:

receiving a request to perform an operation on a lockable resource from a controller in the distributed computing system, wherein the controller is associated with a policy;

wherein the controller sends the request in order to enforce a first policy for controlling resources in the distributed computing system;

determining whether the controller holds a lock on the lockable resource, wherein the lock can be controlled by different controllers, and wherein only one controller can hold a lock on a resource at a given time;

allowing the controller to execute the operation on the lockable resource if the controller holds the lock on the lockable resource;

allowing the controller to acquire the lock if the controller does not hold the lock on the lockable resource; and allowing the controller to execute the operation on the lockable resource if the controller acquires the lock;

wherein the controller can hold locks on other policies and can thereby create a hierarchical locking structure between policies.

2. The method of claim 1, wherein the first policy is configured to command resources in the distributed computing system to perform actions so that the distributed computing system operates in accordance with a rule that is enforced by the first policy, wherein the rule governs behavior of resources within the distributed computing system.

3. The method of claim 1, further comprising throwing an exception if the controller does not hold the lock on the lockable resource and if the controller does not acquire the lock.

4. The method of claim 1, wherein the lock held on the lockable resource expires after a pre-specified lease period, unless the lease is renewed within the pre-specified lease period.

5. The method of claim 1, wherein the lockable resource includes a resource within the distributed computing system.

6. The method of claim 1, wherein the lockable resource includes a second policy for controlling resources in the distributed computing system.

7. The method of claim 1, wherein the controller includes a client in the distributed computing system.

8. The method of claim 1, wherein the controller includes the first policy for controlling resources in the distributed computing system.

9. The method of claim 1, wherein the controller includes a higher-level policy for controlling resources in the distributed computing system, and wherein the lockable resource includes a lower-level policy for controlling resources in the distributed computing system.

10. The method of claim 1, wherein allowing the controller to acquire the lock includes allowing the controller to acquire the lock from a resource that allocates locks to controllers.

11. The method of claim 1, wherein the lockable resource presents one or more independent locks providing access to independent sub-units of the resource.

12. A computer-readable storage medium storing instructions that when executed by a computer cause the computer to perform a method for providing concurrency control for a policy-based management system that controls resources in a distributed computing system, the method comprising:
receiving a request to perform an operation on a lockable resource from a controller in the distributed computing system, wherein the controller is associated with a policy;
wherein the controller sends the request in order to enforce a first policy for controlling resources in the distributed computing system;
determining whether the controller holds a lock on the lockable resource, wherein the lock can be controlled by different controllers, and wherein only one controller can hold a lock on a resource at a given time;
allowing the controller to execute the operation on the lockable resource if the controller holds the lock on the lockable resource;
allowing the controller to acquire the lock if the controller does not hold the lock on the lockable resource; and
allowing the controller to execute the operation on the lockable resource if the controller acquires the lock;
wherein the controller can hold locks on other policies and can thereby create a hierarchical locking structure between policies.

13. The computer-readable storage medium of claim 12, wherein the first policy is configured to command resources in the distributed computing system to perform actions so that the distributed computing system operates in accordance with a rule that is enforced by the first policy, wherein the rule governs behavior of resources within the distributed computing system.

14. The computer-readable storage medium of claim 12, wherein the method further comprises throwing an exception if the controller does not hold the lock on the lockable resource and if the controller does not acquire the lock.

15. The computer-readable storage medium of claim 12, wherein locks held by the controller expire after a pre-specified lease period, unless the lease is renewed within the pre-specified lease period.

16. An apparatus that provides concurrency control within a policy-based management system that controls resources in a distributed computing system, the apparatus comprising:
a receiving mechanism that receives a request to perform an operation on a lockable resource from a controller in the distributed computing system, wherein the controller is associated with a policy;
wherein the controller sends the request in order to enforce a first policy for controlling resources in the distributed computing system;
a determining mechanism that determines whether the controller holds a lock on the lockable resource, wherein the lock can be controlled by different controllers, and wherein only one controller can hold a lock on a resource at a given time;
an execution mechanism that is configured to,
allow the controller to acquire the lock if the controller does not hold the lock on the lockable resource, and to
allow the controller to execute the operation on the lockable resource if the controller holds the lock on the lockable resource;
wherein the controller can hold locks on other policies and can thereby create a hierarchical locking structure between policies.

17. The apparatus of claim 16, wherein the first policy is configured to command resources in the distributed computing system to perform actions so that the distributed computing system operates in accordance with a rule that is enforced by the first policy, wherein the rule governs behavior of resources within the distributed computing system.

18. The apparatus of claim 16, wherein the execution mechanism is configured to throw an exception if the controller does not hold the lock on the lockable resource and if the controller does not acquire the lock.

19. The apparatus of claim 16, wherein the lock on the lockable resource expires after a pre-specified lease period, unless the lease is renewed within the pre-specified lease period.

20. The apparatus of claim 16, wherein the lockable resource includes a resource within the distributed computing system.

21. The apparatus of claim 16, wherein the lockable resource includes a second policy for controlling resources in the distributed computing system.

22. The apparatus of claim 16, wherein the controller includes a client in the distributed computing system.

23. The apparatus of claim 16, wherein the controller includes the first policy for controlling resources in the distributed computing system.

24. The apparatus of claim 16, wherein the controller includes a higher-level policy for controlling resources in the distributed computing system, and wherein the lockable resource includes a lower-level policy for controlling resources in the distributed computing system.

25. The apparatus of claim 16, wherein the execution mechanism is configured to allow the controller to acquire the lock from a resource that allocates locks to controllers.

26. The apparatus of claim 16, wherein the lockable resource presents one or more independent locks providing access to independent sub-units of the resource.

* * * * *